United States Patent [19]

Nelle

[11] Patent Number: 5,630,283
[45] Date of Patent: May 20, 1997

[54] LINEAR OR ANGULAR ENCODER

[75] Inventor: Günther Nelle, Bergen, Germany

[73] Assignee: Dr. Johannes Heidenhain GmbH, Traunreut, Germany

[21] Appl. No.: 415,955

[22] Filed: Apr. 3, 1995

[30] Foreign Application Priority Data

May 6, 1994 [EP] European Pat. Off. ............ 94107103

[51] Int. Cl.⁶ .................................................. G01B 11/04
[52] U.S. Cl. .................................................. 33/702; 33/706
[58] Field of Search ............................... 33/1 PT, 702, 33/703, 704, 706, 707, 708

[56] References Cited

U.S. PATENT DOCUMENTS

| | | |
|---|---|---|
| 4,492,033 | 1/1985 | Ichikawa . |
| 4,495,703 | 1/1985 | Sakata et al. ............ 33/1 M |
| 4,569,137 | 2/1986 | Ichikawa . |
| 4,777,728 | 10/1988 | Ludicke ............ 33/702 |
| 5,065,525 | 11/1991 | Szenger ............ 33/704 |
| 5,115,573 | 5/1992 | Rieder et al. ............ 33/706 |

FOREIGN PATENT DOCUMENTS

| | | |
|---|---|---|
| 0118607 | 9/1984 | European Pat. Off. . |
| 2643304 | 4/1978 | Germany . |
| 1536365 | 12/1978 | Germany . |
| 3118607 | 3/1982 | Germany . |
| 3605789 | 4/1987 | Germany . |
| 0219818 | 9/1986 | Japan . |

*Primary Examiner*—G. Bradley Bennett
*Attorney, Agent, or Firm*—Anderson Kill & Olick P.C.

[57] ABSTRACT

An encoder including a measuring standard, a scanner for scanning the grating of the measuring standard, a measuring standard carrier having a groove for receiving the measuring standard, a relatively thin glue layer provided between one of the opposite surfaces of the groove and the measuring standard, and at least one spring element provided between another of the opposite surfaces of the groove and the measuring standard.

7 Claims, 1 Drawing Sheet

LINEAR OR ANGULAR ENCODER

BACKGROUND OF THE INVENTION

The present invention relates to an encoder including a measuring standard, a scanner for scanning the grating provided on the measuring standard and for generating a position signal, and a measuring standard carrier having a groove for receiving the measuring standard therein.

The encoder of this type are used for measuring a relative position of two parts and can be formed as linear or angular encoders.

German patent No. 2,505,587 discloses a linear encoder in which the measuring standard is attached to the carrier with a glue layer. In order to prevent measuring inaccuracies, resulting from different coefficients of thermal expansion of the carrier and the measuring standard, the attachment of the measuring standard to the carrier is effected without the measuring standard and the carrier directly contacting each other. The attachment is effected with an elastic glue. The drawback of such an attachment consists in that the measuring standard, because of being attached to the carrier only with an elastic glue layer, is not held sufficiently sturdy and is, therefore, susceptible co vibrations.

To eliminate this drawback, German patent 2,643,304 suggests to secure the measuring standard so that it would abut edges of a rectangular groove provided in the carrier and extending in the measuring direction. In the encoder of this German patent, the measuring standard in the middle portion thereof is secured in the groove with an unelastic glue and is secured with a highly elastic glue on both sides of the middle portion. The drawback of this solution consists in that the measuring standard, because of an elastic connection on only one surface, is still somewhat susceptible to vibrations. A direct contact of the measuring standard with the edges of the groove presents another drawback which consists in that the manufacturing errors of the carrier are transmitted to the measuring standard and results in measurement errors.

To reduce the vibrations of the measuring standard, it was suggested to secure a measuring standard in a carrier with more than one surfaces. Such an encoder is disclosed in German publication No. 3,118,607. In the encoder of DE-3, 118,607, the measuring standard is secured in a longitudinal groove of the carrier, with the measuring standard directly contacting a side surface and the bottom of the groove. The space between the other side surface of the groove and the measuring standard is filled with a rubber bar and an elastic glue serving as a sealing compound. Thus, the measuring standard is rigidly secured in one region thereof. The drawback of this attachment consists in that the space, filled with the elastic glue, is relatively wide, which again adversely affect the vibration characteristics of the measuring standard. Another drawback of this attachment consists in that preloading of the measuring standard with a rubber bar prevents or substantially hinders free longitudinal expansion of the measuring standard and the carrier.

German Patent DE-3,605,789 discloses an encoder in which the measuring standard is likewise secured in a groove provided in a carrier. The measuring standard is embedded, along its narrow portion, in a permanently elastic sealing compound. To insure a longitudinal expansion of the measuring standard relative to the carrier, the sealing compound should be highly elastic and that adversely affects the vibration characteristics and the stability of the measuring standard.

Accordingly, an object of the invention is an encoder in which different thermal characteristics of the measuring standard and the carrier practically exercise no influence on the measurement results.

Another object of the invention is an encoder in which the measuring standard is secured to the carrier relatively vibration-free.

SUMMARY OF THE INVENTION

These and other objects of the present invention, which will become apparent hereinafter, are achieved by providing an encoder including a measuring standard having a grating, a scanner for scanning the grating, a measuring standard carrier having a groove for receiving the measuring standard, a relatively thin glue layer provided between one of the opposite surfaces of the groove and the measuring standard, and at least one spring element provided between another of the opposite surfaces of the groove and the measuring standard.

The advantage of the encoder according to the present invention consists in that an unhindered longitudinal expansion of the measuring standard relative to the carrier is insured, without adversely affecting the stability of the measuring standard. This advantage is particularly important when the measuring standard is formed of glass, and the carrier if formed of metal, e.g., of aluminum. The present invention provides for stable and substantially vibration-free securing of the measuring standard in the carrier.

BRIEF DESCRIPTION OF THE DRAWINGS

The features and objects of the present invention will become more apparent, and the invention itself will be best understood from the following detailed description of the preferred embodiment when read with reference to the accompanying drawings, wherein.

DETAILED DESCRIPTION OF THE PREFERRED EMBODIMENT

Figure 1:
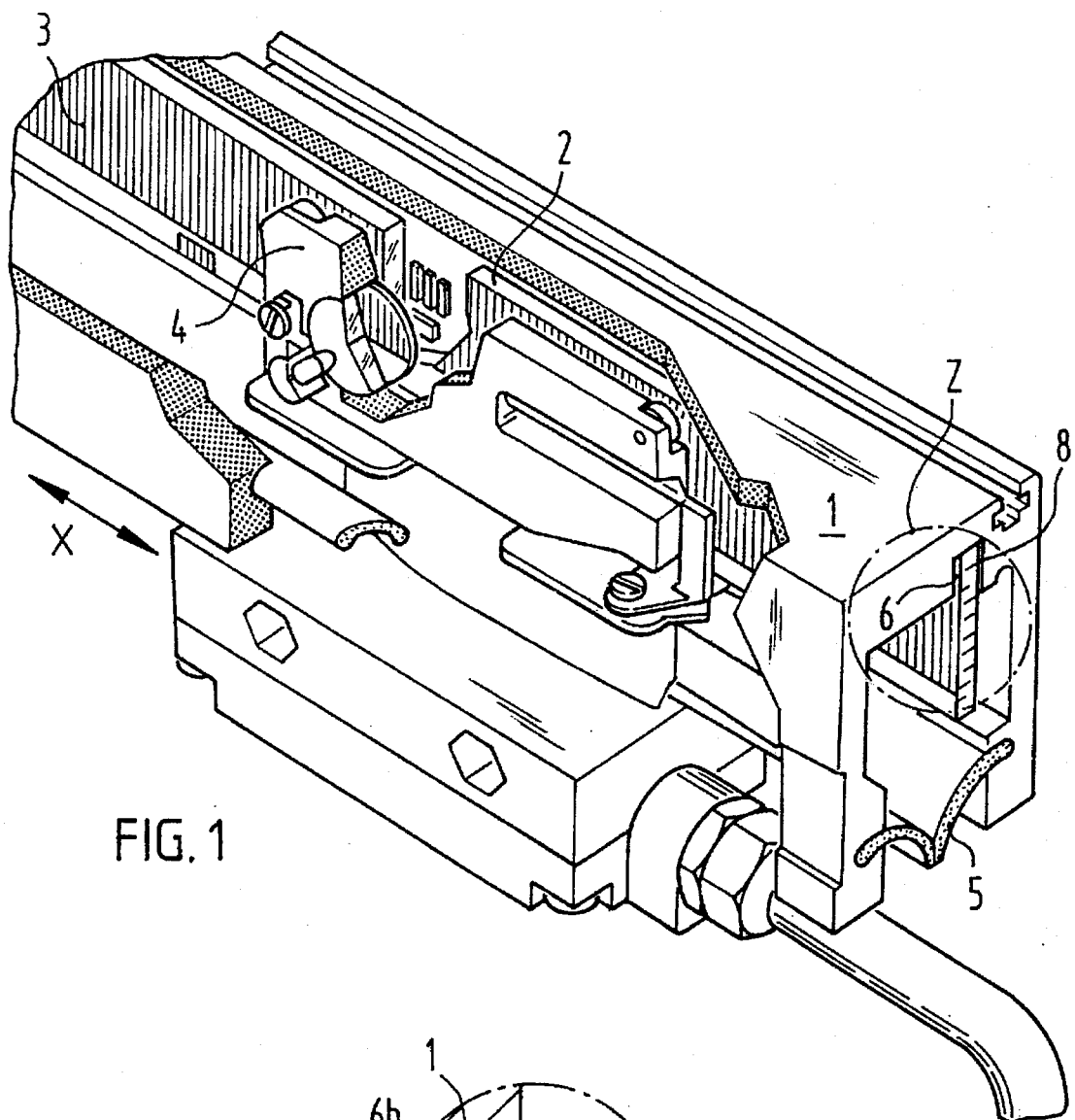
FIG. 1 is a perspective partially cut out view of a linear encoder according to the present invention.

A linear encoder according to the present invention, which is shown in FIG. 1, includes a housing 1 serving as a carrier for a measuring standard 2. A grating 3 is provided on the measuring standard 2. The linear encoder according to the present invention further includes a scanner 4 for photoelectrically scanning the grating 3. The housing 1 is formed of aluminum, and the measuring standard 2 is formed of glass. For measuring relative displacement of two parts, the housing 1 is secured on one of the parts, and the scanner 4 is secured on the other of the two parts. The measuring standard 2 and the scanner 4 are protected from environmental influence by the housing 1 and a sealing 5.

According to the present invention, a groove 6, which extends in the measuring direction is provided in the housing 1. The measuring standard 2 is arranged in the groove 6 with a possibility of linear displacement. Despite this, the position of the measuring standard 2 in the groove 6 is relatively stable and vibration-free. A thin elastic glue layer 8 (with a thickness of about 0.1 mm) is provided on one side surface 7 of the measuring standard 2. The glue layer 8 extends between the measuring standard 2 and a body of the housing 1 and forms a separation layer which permits relative movement between the measuring standard 2 and the housing 1 resulting from different coefficients of thermal expansion of the housing 1 and the measuring standard 2.

The material, of which the layer 8 is formed, advantageously is silicone-free. The layer 8 prevents slippage of the measuring standard relative to the housing, without any hindrance to free expansion of the two components relative to each other.

A spring 9, which is provided in the groove 6 between the groove wall 6b and the measuring standard 2, prevents separation of the measuring standard 2 from the glue layer 8 under forces from the scanner 4. The separation of the measuring standard 2 from the glue layer 8, which may be caused by vibration and acceleration forces, is likewise prevented.

Figure 2:
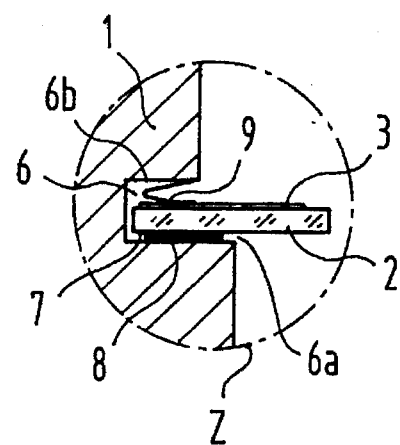
FIG. 2 is a cross-sectional view of a portion of the linear encoder shown in FIG. 1, which is designated with letter Z in FIG. 1.

The spring 9 is preferably formed of a continuous section of a spring steel sheet, which is preferably bent as shown in FIG. 2.

Advantageously, a strong spring is provided in the middle of the scale for reliably fixing the zero position point.

While the invention is being described with reference to a linear encoder, its principles are equally applicable to an angular encoder. In angular encoders, the grating is provided on an arcuate profile.

Further, the present invention can be implemented not only with glass measuring standards but also with measuring standards but also with measuring standards formed of metal or plastics. Likewise, the principles of the invention are applicable to encoders using a scanning principle different from photo-electrical scanning. Thus, the measuring standard may have a grating based on a capacitance, inductive or magnetic principle. Also, several grating bands or an absolute information band can be provided on the measuring standard.

A housing is not the only means that can serve as a carrier for a measuring standard. Metal rails can also serve as a measuring standard carrier as, e.g., in so-called exposed systems.

What is claimed is:

1. An encoder, comprising:

a measuring standard having a grating;

a scanner for scanning the grating;

a measuring standard carrier having a groove for receiving said measuring standard, said groove having two opposite surfaces between which said measuring standard is received;

a relatively thin glue layer provided between one of the two opposite surfaces of said groove and said measuring standard; and at least one spring element provided between another of the two opposite surfaces of said groove and said measuring standard for retaining said measuring standard in said groove with a possibility of thermal elongation of said measuring standard in a measuring direction substantially independent of said carrier, wherein said at least one spring element comprises a continuous section of a spring steel sheet.

2. An encoder as set forth in claim 1, wherein the glue layer is formed of a silicon-free material.

3. An encoder as set forth in claim 1, wherein said continuous section of a spring steel sheet is formed as a bent section.

4. An encoder as set forth in claim 1, further including a reinforced spring element provided in a predetermined position along said measuring standard for fixing a zero position point.

5. An encoder as set forth in claim 1, wherein said glue layer and said at least one spring element are arranged opposite each other before insertion of the measuring standard.

6. An encoder as set forth in claim 1, wherein said glue layer comprises and adhesive film.

7. An encoder as set forth in claim 1, wherein said carrier comprises a hollow profile.

* * * * *